United States Patent
Gray et al.

(10) Patent No.: US 7,143,865 B2
(45) Date of Patent: Dec. 5, 2006

(54) FISHING CHAIR HAVING A SAND STABILIZER

(76) Inventors: Jonathan Gray, 2212 Calloway Garden Ct., Pflugerville, TX (US) 78660; Don Craigen, P.O. Box 877, Pagosa Springs, CO (US) 81141

( * ) Notice: Subject to any disclaimer, the term of this patent is extended or adjusted under 35 U.S.C. 154(b) by 216 days.

(21) Appl. No.: 10/799,809

(22) Filed: Mar. 12, 2004

(65) Prior Publication Data

US 2004/0178666 A1    Sep. 16, 2004

Related U.S. Application Data

(60) Provisional application No. 60/454,175, filed on Mar. 12, 2003.

(51) Int. Cl.
*E06C 7/16* (2006.01)
*A47C 19/22* (2006.01)

(52) U.S. Cl. .................... 182/116; 182/33; 182/33.3

(58) Field of Classification Search .............. 182/116, 182/115, 20, 33, 33.3
See application file for complete search history.

(56) References Cited

U.S. PATENT DOCUMENTS

| | | | | | |
|---|---|---|---|---|---|
| 2,207,445 | A | * | 7/1940 | Seidner | 182/116 |
| 3,022,524 | A | * | 2/1962 | Hultquist | 297/352 |
| 3,151,910 | A | * | 10/1964 | Arvid | 297/344.22 |
| 3,357,741 | A | * | 12/1967 | Vadner | 182/129 |
| 3,967,694 | A | * | 7/1976 | Woolfolk, Sr. | 182/115 |
| 5,582,268 | A | * | 12/1996 | Heberlein | 182/113 |
| 5,881,839 | A | * | 3/1999 | Stanley | 182/116 |
| 6,637,549 | B1 | * | 10/2003 | Lopacki | 182/115 |

* cited by examiner

*Primary Examiner*—Hugh B. Thompson, II
(74) *Attorney, Agent, or Firm*—Antony P. Ng; Dillon & Yudell LLP

(57) ABSTRACT

A fishing chair having a sand stabilizer is disclosed. The fishing chair includes a front frame, a back frame, a chair frame and a stabilization frame. The chair frame is pivotally connected to at least one of the front and back frames. The stabilization frame is pivotally connected to the back frame. The stabilization frame provides stability to the fishing chair when the fishing chair is being used in the middle of a body of water.

1 Claim, 3 Drawing Sheets

FISHING CHAIR HAVING A SAND STABILIZER

RELATED PATENT APPLICATION

The present patent application claims priority to copending provisional application U.S. Ser. No. 60/454,175, filed on Mar. 12, 2003.

BACKGROUND OF THE INVENTION

1. Technical Field

The present invention relates to fishing chairs in general, and in particular to collapsible fishing chairs. Still more particularly, the present invention relates to a collapsible fishing chair having a sand stabilizer.

2. Description of the Related Art

Fishing is a popular outdoor activity for leisure. Because of the time duration associated with fishing, most fishermen would prefer to sit in a fishing chair while fishing. The fishing chair can be placed on land or on a vessel, depending on the type of fishing involved. For surf fishing, the desirable fishing site is typically located in the middle of a body of water. As such, it is important for a fishing chair to have elongated legs such that the fisherman can sit as high above the water as possible when fishing.

In addition, because the ground under water, which is commonly formed by an accumulation of sand, tends to be very unstable, it would be desirable to have some mechanism on a fishing chair to stabilize itself when being set in the middle of a body of water. Such mechanism should provide stability to the fishing chair even when the fishing chair is being confronted with light water current.

SUMMARY OF THE INVENTION

In accordance with a preferred embodiment of the present invention, a fishing chair includes a front frame, a back frame, a chair frame and a stabilization frame. The chair frame is pivotally connected to at least one of the front and back frames. The stabilization frame is pivotally connected to the back frame. The stabilization frame provides stability to the fishing chair when the fishing chair is being used in the middle of a body of water.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
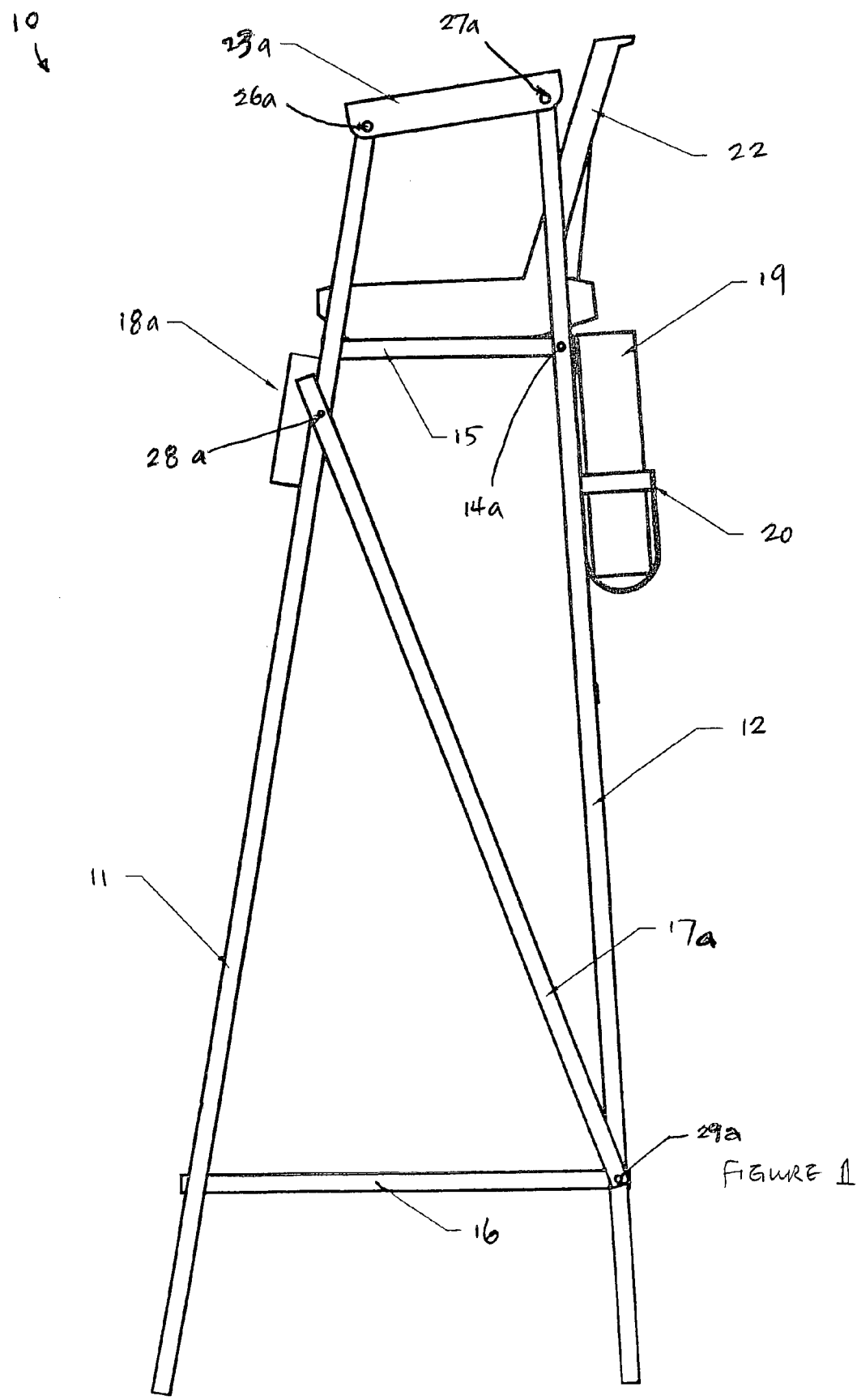
FIG. 1 is a side view of a fishing chair, in accordance with a preferred embodiment of the present invention.
Figure 2:
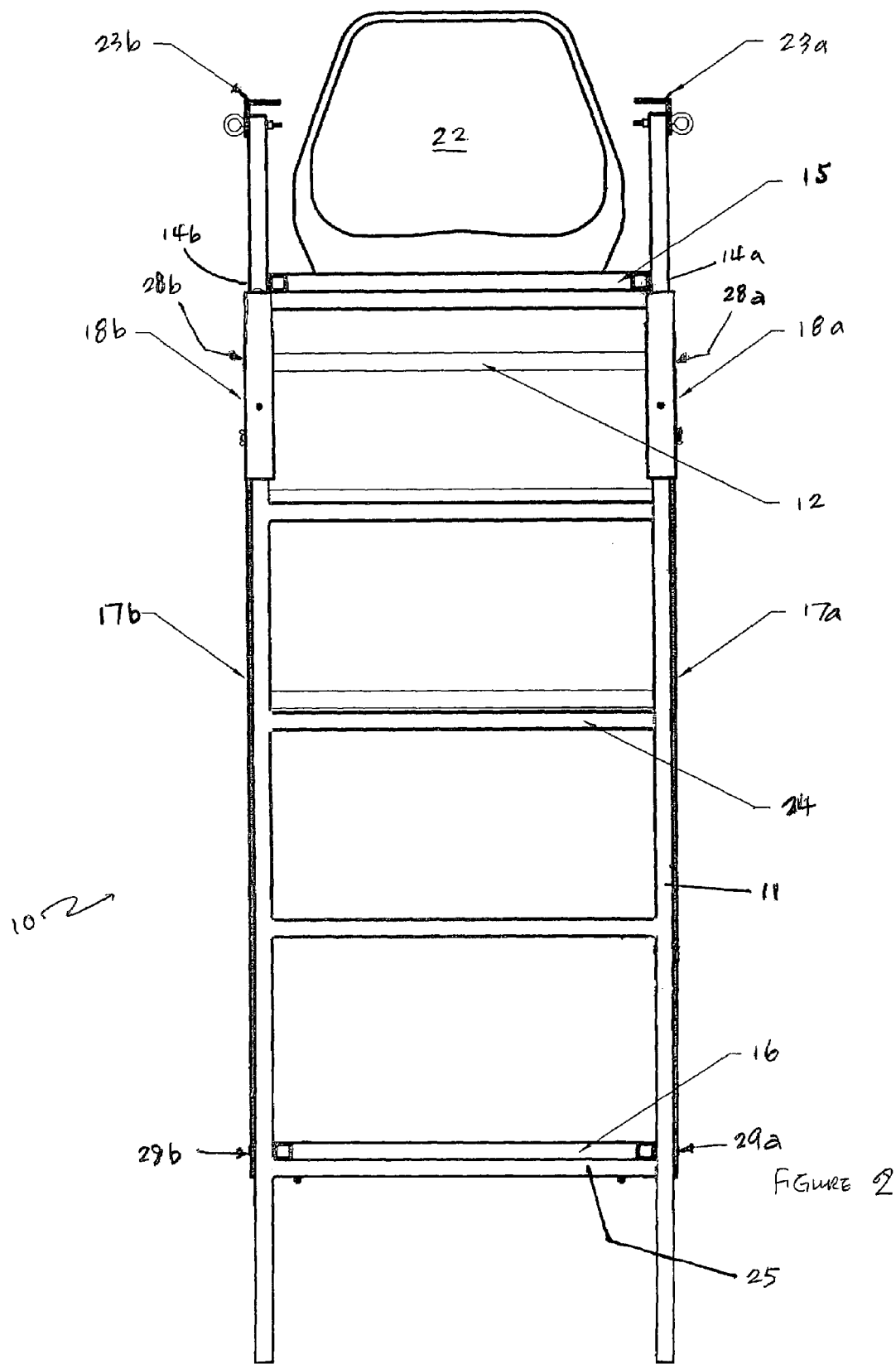
FIG. 2 is a front view of the fishing chair from FIG. 1, in accordance with a preferred embodiment of the present invention.

Referring now to the drawings and in particular to FIGS. 1 and 2, there are depicted a side view and a front view of a fishing chair, respectively, in accordance with a preferred embodiment of the present invention. As shown, a fishing chair 10 includes a front frame 11, a back frame 12, a chair frame 15 and a stabilization frame 16. Front frame 11, back frame 12, chair frame 15 and stabilization frame 16 are preferably made of 1 inch by 1 inch aluminum tubes. For the present embodiment, the cross-sections of front frame 11, back frame 12, chair frame 15 and stabilization frame 16 are in square shape; however, it is understood by those skilled in the art that any cross-sectional shape is applicable for the present invention. Each of front frame 11 and back frame 12 resembles a ladder with steps, such as steps 24–25, distributed from top to bottom of front frame 11 and from top to bottom of back frame 12. Back frame 12 is preferably in even length with front frame 11. For example, both front frame 11 and back frame 12 are approximately 6 feet long.

A pair of fishing rod holders 18a–18b is attached to the front side of front frame 11. A detachable personal floatation device (PFD) 19 is securely contained within a PFD frame 20 attached to back frame 12. In addition to providing the necessary buoyancy for fishing chair 12 to float on water, PFD 19 can also be worn by a fisherman in case of emergency. A chair assembly 22 is situated on top of chair frame 15. Chair frame 15 is pivotally connected to back frame 12 at joints 14a and 14b. Chair frame 15 can be swing towards back frame 12 and be positioned to flush with back frame 12 when fishing chair 10 is in a fold or collapsed position. Preferably, chair assembly 22 includes a seat and a back. To provide further comfort for a fisherman sitting on chair assembly 22, armrests 23a and 23b are pivotally connected to the distal ends of front frame 11 and back frame 12. For example, armrest 23a is pivotally connected to the distal end of front frame 11 and back frame 12 at joints 26a and 27a, respectively. Utility items, such as a tackle box, a drink holder, etc., can be mounted on armrests 23a and 23b.

A side stabilization bar 17a is pivotally connected to front frame 11 and back frame 12 at joints 28a and 29a, respectively. Similarly, a side stabilization bar 17b is pivotally connected to front frame 11 and back frame 12 at joints 28b and 29b, respectively. Stabilization frame 17a is pivotally connected to back frame 12 at joints 29a and 29b. The front end of stabilization frame 16 can be rested on step 25 of front frame 11 when fishing chair 10 is being in use in an unfold position as shown in FIG. 1. Otherwise, stabilization frame 16 can be swung towards back frame 12 and be positioned to flush with back frame 12 when fishing chair 10 is in a fold or collapsed position.

Figure 3A:
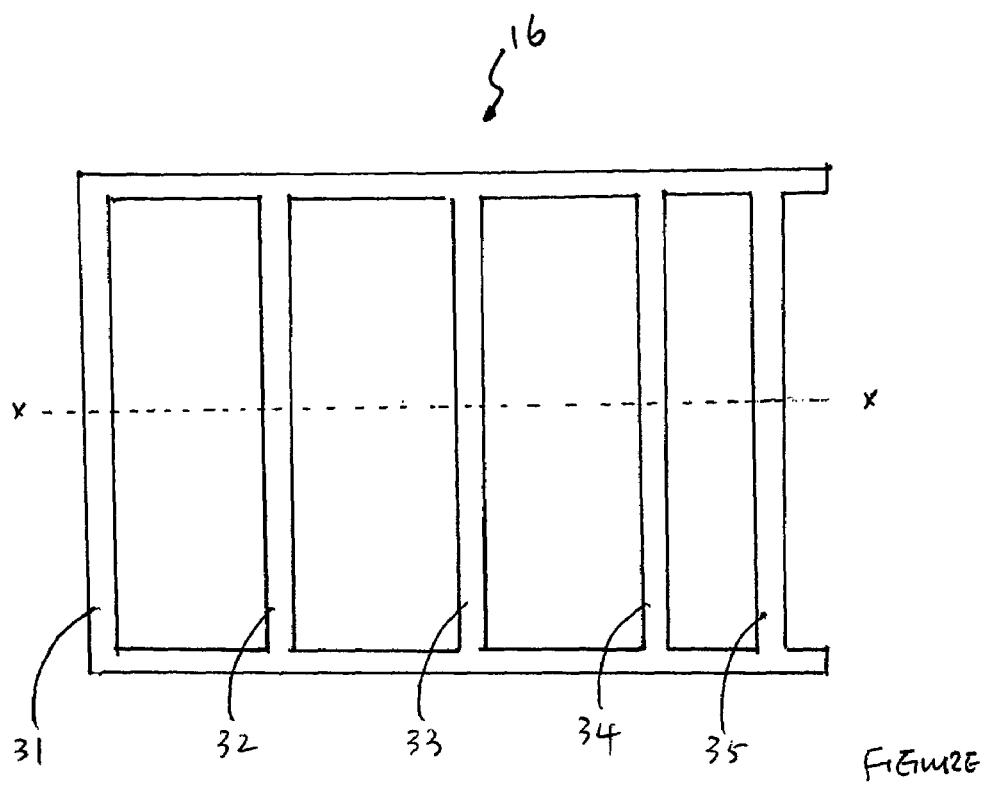
FIG. 3a is a top view of a stabilization frame attached to the fishing chair from FIG. 1, in accordance with a preferred embodiment of the present invention.
Figure 3B:
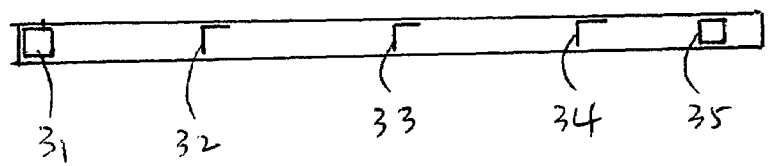
FIG. 3b is a cross-section view of the stabilization frame from FIG. 3a, in accordance with a preferred embodiment of the present invention.

Referring now to FIG. 3a, there is depicted a top view of stabilization frame 16, in accordance with a preferred embodiment of the present invention. As shown, stabilization frame 16 resembles a ladder with steps, such as steps 31–35, distributed across the length of stabilization frame 16. Preferably, the cross-section of some of steps 31–35 are in a "⌈" shape. For example, as shown in FIG. 3b, which is the cross-section view of stabilization frame 16 across x—x, the cross-sections of steps 32–34 are in "⌈" shapes.

After a fisherman has found a desirable fishing location somewhere in the middle of a body of water, the fisherman can place fishing chair 10 in an unfold position as shown in FIG. 1. The fisherman can then situate the legs of front frame 11 and back frame 12 in the sand bottom of the body of water until stabilization frame 16 flush with the sand bottom. At such point, the "⌠" shape steps 32–34 can "dig" into the sand bottom to provide stabilization for fishing chair 10 against water current and such. At the end of the fishing activity, the fisherman can release fishing chair 10 from the sand bottom by wiggling either one of front frame 11 and back frame 12 or both of front frame 11 and back frame 12.

As has been described, the present invention provides a fishing chair having a sand stabilizer such as stabilization frame 16. The sand stabilizer stabilizes the fishing chair in all types of bottom strata under water, keeping the fishing chair from sinking or shifting in surf or bay once a fisherman sits down on it.

While the invention has been particularly shown and described with reference to a preferred embodiment, it will be understood by those skilled in the art that various changes in form and detail may be made therein without departing from the spirit and scope of the invention.

What is claimed is:

1. A fishing chair consisting of:
   a front frame having an upper end and a lower end;
   a back frame having an upper end and a lower end, wherein said back frame is pivotally connected to said front frame;
   a chair located on proximity to said upper ends of said front and back frames; and
   a stabilization frame located in proximity to said lower ends of said front and back frames, wherein said stabilization frame is constructed to provide stability for said fishing chair by frictionally engaging said stabilization frame with granular materials when said fishing chair is placed on said granular materials;
   wherein said stabilization frame includes steps having a "⌠" cross-section;
   wherein said fishing chair further includes a pair of stabilization bars pivotally connected to said front and back frames;
   wherein said front and back frames include a plurality of steps; and
   wherein the lengths of said back and front frames are different.

* * * * *